United States Patent [19]
Nilsson

[11] Patent Number: 6,030,493
[45] Date of Patent: Feb. 29, 2000

[54] PROCESS FOR RECOVERING CHEMICALS AND ENERGY FROM CELLULOSE SPENT LIQUOR USING MULTIPLE GASIFIERS

[75] Inventor: Bengt Nilsson, Skoghall, Sweden

[73] Assignee: Kvaerner Pulping, AB, Karlstad, Sweden

[21] Appl. No.: 08/850,350

[22] Filed: May 2, 1997

Related U.S. Application Data

[63] Continuation of application No. PCT/SE95/01219, Oct. 18, 1995.

[30] Foreign Application Priority Data

Nov. 4, 1994 [SE] Sweden .................................. 9403786

[51] Int. Cl.⁷ .................................................. D21C 11/12
[52] U.S. Cl. ........................ 162/30.1; 162/30.11; 162/31; 422/185; 422/227
[58] Field of Search .................................. 162/16, 17, 29, 162/30.1, 30.11, 31, 47, 41; 48/69, 111, 209; 261/DIG. 54; 422/172, 185, 207, 227; 423/234

[56] References Cited

U.S. PATENT DOCUMENTS

| | | | |
|---|---|---|---|
| 3,841,962 | 10/1974 | Procter et al. | 162/30 |
| 5,326,433 | 7/1994 | Ryham et al. | 162/14 |
| 5,489,363 | 2/1996 | Marcoccia et al. | 162/43 |
| 5,509,997 | 4/1996 | Kuusio | 162/16 |

FOREIGN PATENT DOCUMENTS

| | | |
|---|---|---|
| 42 04 088 A1 | 8/1992 | Germany . |
| 9402197 | 6/1994 | Sweden . |
| WO 86/07396 | 12/1986 | WIPO . |
| WO91/19042 | 12/1991 | WIPO . |
| WO 93/12288 | 6/1993 | WIPO . |
| WO 96/14468 | 5/1996 | WIPO . |

*Primary Examiner*—Dean T. Nguyen
*Attorney, Agent, or Firm*—Jeffrey S. Melcher; Farkas & Manelli, PLLC

[57] ABSTRACT

Provided is a process for recovering chemicals and energy from spent liquor obtained when producing paper pulp by chemical delignificatation of fibrous raw material. The spent liquor is gasified in at least two reactors, a first and a second stream of solid and/or smelt material and of combustible gaseous material being formed. The formed material is treated in one or more devices (5, 6, 7, 8), whereby a first (9) and a second liquor (27) are formed. The pressure and/or temperature in the first reactor differ(s) from the pressure and/or temperature in the second reactor. In addition, one or more process chemicals are recovered selectively from the formed liquor and/or gas, and are thereafter returned in whole or in part to one or more of the reactors (1, 2) and/or to one or more of the devices (5, 6, 7, 8) for treatment of the formed material.

29 Claims, 3 Drawing Sheets

PROCESS FOR RECOVERING CHEMICALS AND ENERGY FROM CELLULOSE SPENT LIQUOR USING MULTIPLE GASIFIERS

This is a continuation of International application No. PCT/SE95/01219 filed Oct. 18, 1995 which designated the U.S. and is related to U.S. application Ser. No. 08/850,349, filed on May 2, 1997.

TECHNICAL FIELD

The present invention relates to a process for recovering chemicals and energy from black liquor which is obtained when producing paper pulp by chemical digesting of fibrous raw material.

STATE OF THE ART AND PROBLEMS

When producing paper pulp by the kraft method, a spent liquor is obtained, generally called black liquor, containing organic material and the residual chemicals which have been obtained when digesting the fibrous raw material. This black liquor is generally evaporated and conveyed to a separate processing stage for recovery of the energy content of the organic material and also for recovery of the cooking chemicals as so-called green liquor. The so-called Tomlinson process has for long been the commercially predominant method for this recovery of energy and chemicals. However, a disadvantage of this process, which is by now very old, is that it requires very large combustion furnaces which are complicated from the technical and operational points of view.

Swedish Patent SE-C-448 173 describes a more modern process which, in addition to considerably simplifying the necessary process equipment, achieves improved recovery of both energy and chemicals. This process is based on a pyrolysis reaction in which the black liquor is gasified in a so-called Chemrec® reactor, giving an energy-rich gas principally comprising carbon monoxide, carbon dioxide, methane, hydrogen and hydrogen sulphide, as well as inorganic chemicals in the form of small drops of smelt, principally comprising sodium carbonate, sodium hydroxide and sodium sulphide. The resulting mixture of gas and drops of smelt is quickly cooled in a first stage by direct contact with a cooling liquid constituting green liquor, which is formed when the smelt chemicals and the hydrogen sulphide are dissolved in the cooling liquid. The gas is thereafter washed in a second stage in a gas washer of the scrubber type. The gas is then used as fuel for generating steam and/or electrical power. The physical thermal value of the gas can also be used when the gas is cooled from the gasification temperature to the saturation temperature for steam at the chosen pressure. The green liquor which is formed is conveyed to a causticizing stage for production of white liquor.

SE-B-468 600 discloses a process for producing white liquor of high sulphidity, that is to say with a high proportion of sodium hydrogen sulphide in relation to the proportion of sodium hydroxide, directly from the gasification reactor and without there being any need for causticizing. In accordance with this process, hydrogen sulphide is recovered from the gaseous phase extracted from a reactor of the Chemrec® type and is returned to the reactor in order to be present during the thermal decomposition of the spent liquor. In this way, such a high partial pressure of hydrogen sulphide is established in the gasification stage that the equilibrium reaction $$Na_2CO_3 + H_2S \rightarrow Na_2S + CO_2 + H_2O \quad (a)$$

is displaced so far to the right that the formation of $Na_2CO_3$ is suppressed. The $Na_2S$ formed is dissociated to give NaOH and NaHS.

The recovery of hydrogen sulphide from the gaseous phase takes place by means of the gas being allowed to pass through a gas washer containing an external absorption chemical, for example N-methyl-pyrrolidone or methyldiethylamine, for selective and regenerative absorption of the $H_2S$ content. The need for such an external chemical represents a disadvantage of this process and additionally makes it necessary to provide a regeneration stage for driving off the hydrogen sulphide from the absorption chemical.

Swedish Patent SE-C-465 039 describes a method which has the object of producing a cooking liquor of high sulphidity. Material containing sulphur and/or material containing sulphur and sodium, which material generally occurs in the pulp mill, is in this case conveyed to a reactor together with the black liquor.

A general disadvantage of previously known recovery techniques is that the recovery of chemicals has been governed by the available process technology. For example, the sulphidity of the white liquor has been adapted to the possibilities of the recovery boiler and not to the requirements of the cooking department. Nor has there been any commercially practicable technique for producing liquor of differing quality for different requirements.

SUMMARY OF THE INVENTION

The present invention, which is a refinement of the concept according to SE 448 173 and SE 468 600, provides a process by means of which it is possible, in an extremely flexible manner, to influence the course of the process in the gasification reaction or in subsequent stages of treatment of the reaction products. The said reaction products can in this way be "tailored" for use at different points in the pulp production process. In particular, in a preferred embodiment of the invention, cooking liquor of variable sulphidity can be produced directly. This means in particular that the need for the causticizing and lime sludge reburning, which was necessary in earlier processes, is minimized or completely obviated, since, in accordance with one aspect of the invention, the process involves a form of auto-causticizing.

The principle of the invention is that the black liquor from the pulp digester is conveyed, following evaporation, to a recovery installation where it is divided between two or more gasification reactors, preferably of the Chemrec® type. A high-energy combustion gas is formed in the reactors by means of a known technique, so-called "flash pyrolysis", the said combustion gas principally comprising one or more of the components carbon monoxide, carbon dioxide, methane, hydrogen and hydrogen sulphide, as well as inorganic chemicals in solid form or in the form of small drops of smelt, principally comprising one or more of the components sodium carbonate, sodium hydroxide and sodium sulphide. The resulting mixture of gas and smelt drops is quickly cooled in a treatment device by direct contact with a cooling liquid principally consisting of water and, in certain embodiments, the liquor which is formed when the smelt chemicals and, perhaps some components are dissolved in the cooling liquid. The gas is purified and thereafter washed in one or more gas treatment devices. The liquor which is formed when some of the reaction products are dissolved in the cooling liquid is preferably collected in a treatment device which is connected directly to each reactor and which is of the liquid bath/quench type.

It has now been shown to be possible to recover selectively, from the liquor which is formed, process chemicals which can be used to influence the course of the process in one or more units in the recovery installation. Thus, according to the invention, process chemicals are recovered, preferably by means of one or more absorbers and strippers, from liquor originating from one or more of the gasification reactors. Alternatively, the combustion gas formed in the reactor can be used for recovering process chemicals.

These process chemicals, originating from liquor and/or combustion gas, are then returned, either in whole or in part, to one or more gasification reactors and/or to one or more devices for treatment of combustion gas or solid and/or smelt inorganic material from the reactors. The concept of the invention also includes the fact that at least one reactor operates at a pressure and/or a temperature differing from the pressure and/or temperature in another reactor.

A preferred embodiment in this case is that the unit or units to which the recovered process chemicals are returned consist(s) of the gasification reactors, liquid baths/quenchers connected to the latter, or the said devices for purifying and washing the combustion gas. The most preferred embodiment is that the recovered process chemical consists of $H_2S$ and that this is returned to one or more gasification reactors in order to be present during the thermal decomposition of the black liquor, so that the reaction equilibrium (a) is driven towards increased production of $Na_2S$. Sulphur additionally has a higher affinity towards sodium than it does towards carbon dioxide, for which reason the proportion of $Na_2S$ is further increased and the proportion of $Na_2CO_3$ decreased. In each reactor, the gasification reaction is controlled, by means of different quantities of returned $H_2S$, in such a way as to produce a liquor of exactly the quality which is desired. A liquor containing almost 100% $Na_2S$ can be produced, if so desired. This can then be mixed, if appropriate, with causticized $Na_2CO_3$, that is to say NaOH, to give the desired quality.

DESCRIPTION OF THE FIGURES

Figure 1:
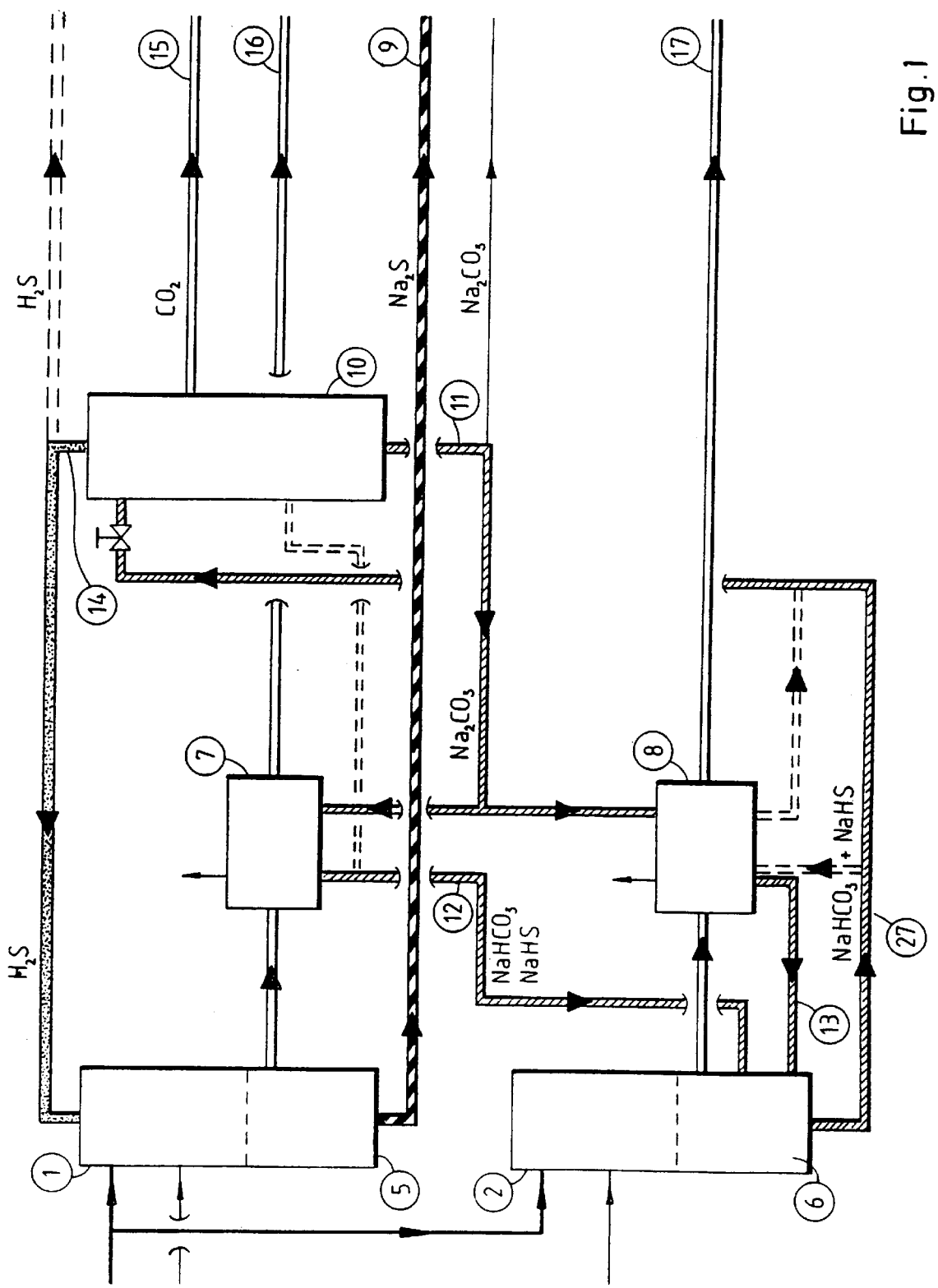
FIG. 1 shows a block diagram of a preferred embodiment of the invention.

Reference number 1 and reference number 2 in FIG. 1 each indicate a pressure vessel comprising a ceramically lined gasification reactor. The reactor is provided with an inlet 3 for black liquor and an inlet 4 for oxygen or oxygen-containing gas, as well as a burner (not shown). In both the reactors, the black liquor is decomposed thermally under substoichiometric conditions.

The oxygen supply is in this case from almost 0 up to 80%, preferably up to 60%, of the stoichiometrically required quantity of oxygen for complete oxidation of organic and inorganic substance. Each reactor has a liquid bath or quench 5 and 6, respectively, for collecting liquor which is formed when the resulting mixture of gas and smelt from the respective reactor is cooled by direct contact with the cooling liquid principally consisting of water. Each reactor also has a unit 7 and 8, respectively, with gas treatment devices for purifying and washing the combustion gas 16 and 17, respectively. The structure of the gas treatment units is shown in more detail in FIG. 2. The combustion gas which leaves the gas treatment units is used as fuel for generating steam and/or electrical power. The physical thermal value of the gas can also be used for generating hot water and/or steam.

Gasification reactor 1 operates at a relatively low pressure (1.5–4 bar absolute) with a high partial pressure of $H_2S$, which means that the reaction equilibrium, in accordance with the same principle as given in SE-B-468 600, is displaced to the right so that the formation of $Na_2CO_3$ in the solid or smelt phase is suppressed in favour of the formation of $Na_2S$ (see reaction (a) above). Intensive contact between the combustion gas formed in reactor 1, with its $CO_2$ content, and the liquor formed when smelt drops and hydrogen sulphide are dissolved in the cooling liquid is avoided as far as possible. It is in this respect preferable for the quench 5 to be designed in accordance with the reactor quench which is described in WO95/35410, that is to say with the outlet from the reactor preferably consisting of a downpipe in which cooling liquid is sprayed directly adjacent to the hot gas outlet through a number of nozzles for maximum contact with the smelt/gas mixture. The cooling liquid consists principally of water or another suitable liquid, which liquid is partially vaporized upon contact with hot gas and smelt at the reactor temperature. The smelt is dissolved in the remaining part of the cooling liquid and in this way forms a liquor which falls down into the liquid bath 5. Alternatively, the smelt falls in the form of drops directly down into the liquid bath 5 and only then is dissolved in the liquor which is already present there. The cooling of the smelt drops then takes place by vaporization of water in the liquid bath. The downpipe opens out immediately above the liquid level in the liquid bath 5. This is important in order to avoid intensive contact between the gas and the formed liquor. If the pipe had opened out below the surface of the liquid, the gas would have been forced to bubble through the liquor, with the result that undesirable reactions between gas and liquor could have taken place. By means of this design of reactor and quench, liquor 9 issuing from reactor 1 will contain in the region of 100% $Na_2S$, dissociated as NaHS and NaOH.

Figure 3:
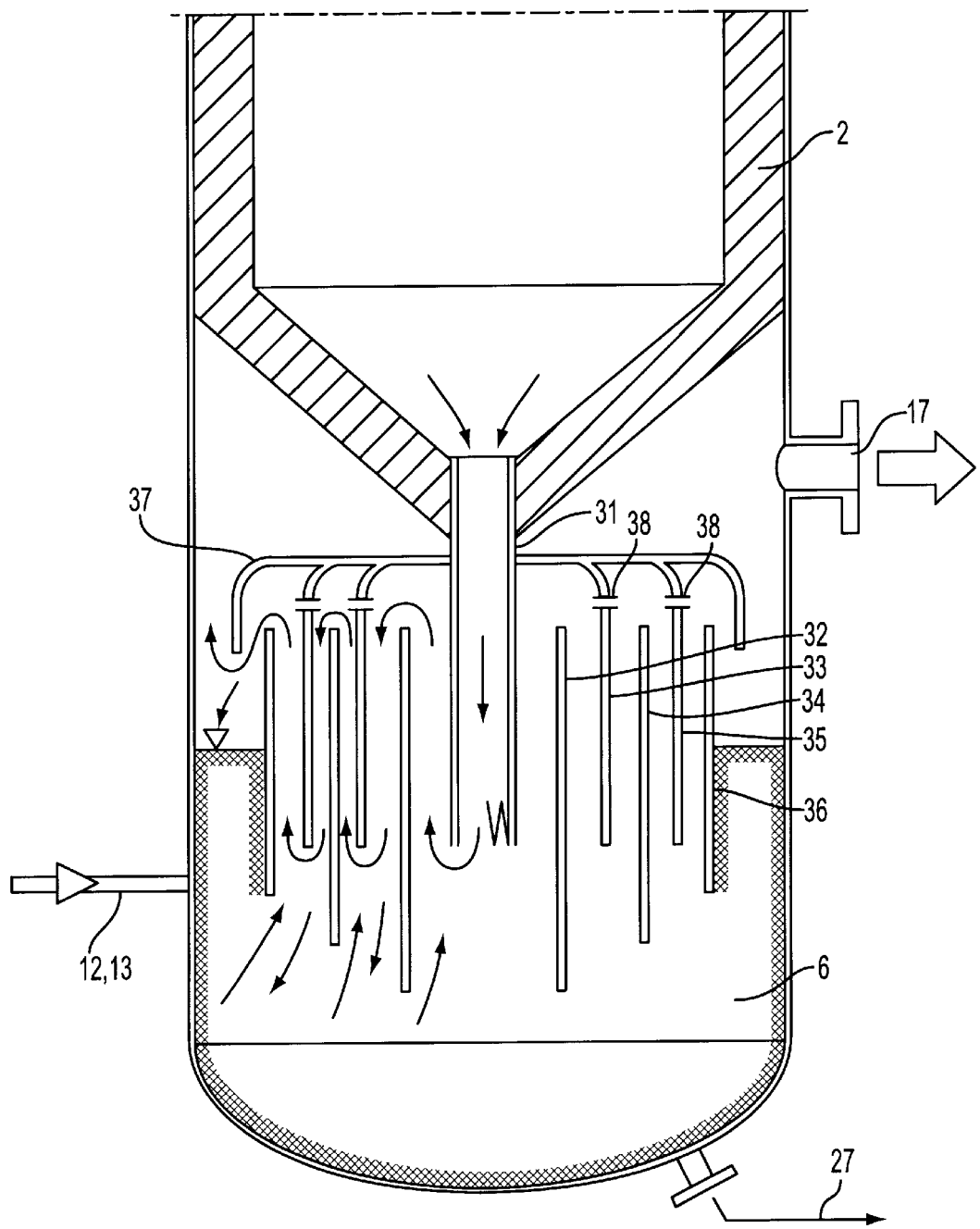
FIG. 3 shows a possible embodiment of a liquid bath/quench.

Gasification reactor 2 operates at a comparatively higher pressure (25 bar absolute) and consequently at a higher liquid bath temperature than that of the liquid bath 5 belonging to reactor 1. The quench/liquid bath 6 belonging to reactor 2 is designed for maximal intensive contact between the combustion gas formed in reactor 2, particularly its content of $CO_2$ and $H_2S$, and the green liquor which is formed when smelt drops and hydrogen sulphide are dissolved in the cooling liquid. This is achieved by the downpipe from the reactor being designed for optimal contact between the gas and the cooling liquid in the quench 6. The downpipe is preferably constructed in such a way that it opens out under the surface of the liquid in the quench, as a result of which the gas is forced to bubble intensively through the liquid. A possible embodiment is shown in FIG. 3. Because the temperature in the quench is high and the contact between gas and liquid is forcedly very good, a high proportion of $HCO_3^-$ and $HS^-$ ions is formed in the green liquor in accordance with reactions (b)–(f) below:

Sodium carbonate in the green liquor is dissociated:

$$Na_2CO_3 \rightarrow 2\,Na^+ + CO_3^{2-} \qquad (b)$$

$CO_3^{2-}$ and $HCO_3^-$ are included together in the acid/base equilibrium:

$$CO_3^{2-} + H_2O \rightarrow HCO_3^- + OH^- \qquad (c)$$

This equilibrium is displaced to the right as the temperature is increased, that is to say the solution becomes more alkaline.

At very good contact between carbon dioxide and liquor, the following consecutive reactions subsequently occur:

$$2\ OH^- + CO_2 \rightarrow CO_3^{2-} + H_2O \tag{d}$$

$$CO_3^{2-} + CO_2 + H_2O \rightarrow 2\ HCO_3^- \tag{e}$$

Carbonate ions in the liquor additionally react with the hydrogen sulphide in the combustion gas:

$$CO_3^{2-} + H_2S \rightarrow HCO_3^- + HS^- \tag{f}$$

Consequently, in the quench 6, a carbonation of the green liquor takes place to give a greatly increased content of hydrogen carbonate and hydrogen sulphide ions. This quench can additionally be supplied with $NaHCO_3$ and NaHS, 12 and 13, from the gas treatment units 7 and 8 of the two reactor lines. This is also a form of return of process chemicals in accordance with the concept of the invention.

The gas treatment units 7 and 8 are supplied with liquor 11 which is low in sulphide and principally consists of $Na_2CO_3$. This has a good absorption capacity for the $H_2S$ and $CO_2$ content of the combustion gas.

The green liquor 27 from the carbonation quench 6 containing high levels of $NaHCO_3$ and NaHS at high temperature and high pressure is pumped to a stripper 10 for expansion and selective driving-off of $H_2S$, 14, and $CO_2$, 15. At the inlet to the stripper, the pressure is lowered from approximately 25 to approximately 2–5 bar (absolute) in the preferred case. $H_2S$ is in this case the first to be driven off as follows:

$$NaHS + NaHCO_3 \rightarrow H_2S + Na_2CO_3 \tag{g}$$

Carbon dioxide requires a longer dwell time to be driven off and, if appropriate, a second digester coupled to the stripper, and it is driven off as follows:

$$2\ NaHCO_3 \rightarrow Na_2CO_3 + CO_2 + H_2O \tag{h}$$

The remainder of the liquor, principally $Na_2CO$, is pumped from the bottom part of the stripper and, in accordance with the concept of the invention, is returned at least in part in the stream 11 to the gas treatment units. The fact that carbon dioxide can be driven off selectively means that the invention, in accordance with this embodiment, involves a form of auto-causticizing. If the preconditions for this auto-causticizing are made sufficiently effective, or if some of the $Na_2CO_3$ can be used, if appropriate, at another point in the pulp process, for example for pre-impregnation of the chips, the usual causticizing process for converting $Na_2CO_3$ to NaOH, including the lime sludge reburning, can be minimized or completely obviated. An alternative utilization of virtually sulphur-free $Na_2CO_3$ is to causticize it to NaOH, which can be used, for example, in bleaching. $H_2S$ which has been driven off is returned in a stream 14 to gasification reactor 1 in order to generate there an increased partial pressure of $H_2S$ so that the equilibrium reaction in the reactor is driven towards increased formation of $Na_2S$ in accordance with reaction (a). It is in this case preferable for all the $H_2S$ which has been driven off to be returned.

Figure 2:
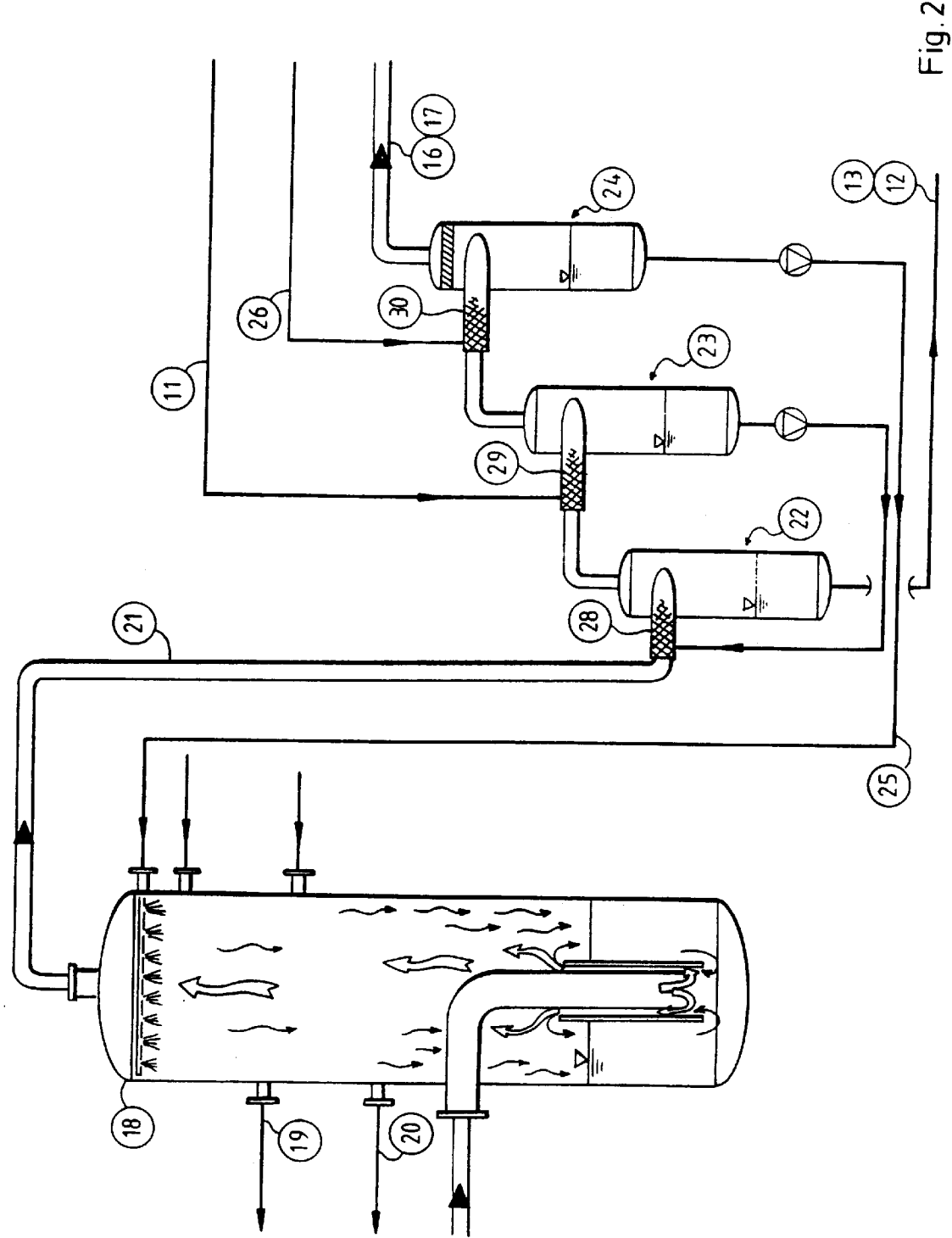
FIG. 2 shows a possible embodiment of the gas treatment units in FIG. 1.

Reference number 18 in FIG. 2 indicates a gas treatment device in the form of a tower in accordance with what is described in WO 95/35410 and consists of a quench (liquid bath) and an indirect cooler, preferably a countercurrent falling-film condenser, for washing gas and recovering energy from hot moisture-saturated combustion gas. Gas treatment in this tower permits production of hot water 19 and steam 20. The pressure of the steam which can be produced is in this case determined by the temperature and system pressure in the associated quench. The combustion gas 21 is conveyed, following treatment in the tower 18, to further gas treatment devices 22, 23 and 24. The gas is purified there, and at the same time its $H_2S$ content absorbed, in a number of scrubber stages which are connected in series and which preferably consist of a static mixer 28, 29 and 30 or venturi scrubber. In the first scrubber stages, low-sulphide liquor 11, principally consisting of $Na_2CO_3$, is used as wash liquid. In the last stage, pure water 26, if appropriate deionized, is preferably used as wash liquid. Liquid 25 issuing from this stage can in this case constitute an addition of water to the gas treatment tower 18 for maintaining the liquid balance in the system. A separate gas treatment unit with tower 18 and separate scrubber stages 22, 23, 24 is preferably connected to each reactor 1, 2.

FIG. 3 shows a possible embodiment of a liquid bath/quench 6 having intensive contact between the combustion gas formed in reactor 2, particularly its $CO_2$ and $H_2S$ content, and the green liquor which is formed when smelt drops and hydrogen sulphide are dissolved in the cooling liquid. Reference number 31 indicates a downpipe which opens out below the surface of the liquid. Arranged concentrically around the downpipe are a number of cylindrical partition walls 32, 33, 34, 35, 36, the lower ends of which are located in the liquid bath. A diverter screen 37 is joined to the upper part of the downpipe, that is to say above the liquid surface. Every other partition wall 33, 35, hereinafter referred to as a diverter wall, is secured at the upper end, in a gas-tight manner, to this diverter screen, while the remaining partition walls 32, 34, 36 are arranged with an opening between the partition wall and the diverter screen. These latter partition walls 32, 34, 36 extend further down in the liquid bath than the diverter walls 33, 35. In addition, they are of progressively decreasing length as seen from the centre outwards. By means of this design, the gas, when it leaves the downpipe, is forced to bubble through the liquid bath several times over, as it is forced up and down through the spaces between the partition walls in order finally to be transferred 17 for further gas treatment 8.

Despite the fact that the diverter walls 33, 35 are secured in a gas-tight manner to the diverter screen 37, it is preferable if a small amount of gas can be passed through the wall, at its upper end, via one or more small holes 38. This avoids the build-up of excessively large and more or less stationary volumes of gas close to the diverter screen.

The design of the quench according to FIG. 3 may also be used in conjunction with other processes for gasification of spent liquor, that is to say processes not directly related to this invention, if good gas/liquid contact is desired.

By means of the invention in accordance with the embodiment described above, or variants of the same, it is possible to maintain different reaction equilibriums in different reactors. This means especially that a liquor which is particularly rich in sulphide can be produced for use as cooking liquid in the initial stage of pulp cooking. High sulphidity during the initial delignification has been stressed, by the Swedish Forest Products Research Laboratory among others, as being an important precondition for selective kraft pulp cooking.

Another advantage is that a large part of the available sodium is bound as $Na_2S$ to the sulphur which is present in the production of sulphide-rich liquor. This reduces the formation of sodium carbonate, which has to be causticized for cooking liquid to be obtained.

A small amount of the sodium carbonate produced can be used, if appropriate, during pre-impregnation of the chips prior to cooking.

Another important advantage is that the lime consumption is considerably reduced, compared to the consumption in the case of conventional black liquor gasification, since the invention involves a form of auto-causticizing. Conventional types of black liquor gasifiers otherwise result in a greater consumption of lime than does the normal recovery boiler process. This is due to the fact that effective alkali which has been obtained during the smelt dissolution, or which has been supplied together with weak liquor, is consumed upon contact with the $CO_2$ and $H_2S$ content of the gas. Both carbonate and hydrogen carbonate are thereby formed, which must be causticized to hydroxide, which consumes lime. In black liquor gasification at a high system pressure, the proportion of sulphur in the combustion gas in the form of $H_2S$ increases. This is normally absorbed by some form of alkali, for example $Na_2CO_3$. Hydrogen carbonate is also formed in this case, which consumes lime in conjunction with subsequent causticizing. Calculations show that black liquor gasification in accordance with the previously known design consumes about 100% more lime than does the recovery boiler process. By using the present invention, the consumption of lime is by contrast about 10% less than in the recovery boiler process.

An energy-related advantage is that the energy which is evolved when $Na_2S$ is dissociated to NaHS and NaOH in the quench of the first reactor can be recovered in the production of hot water and steam. In the quench of the second reactor, the absorption energy is used in a corresponding manner for reactions (e) and (f) above.

ALTERNATIVE EMBODIMENTS

The embodiment according to the above description is a preferred one. However, the invention is not limited to this description, and can instead be varied within the scope of the patent claims. Thus, it is also conceivable for process chemicals other than $H_2S$ to be recovered from the liquor or the combustion gas and to be returned to one or more reactors in order to displace the reaction equilibrium in these reactors. Alternatively, the recovered process chemical or process chemicals is/are returned to one or more second devices within the recovery installation in order there to influence the course of the process.

An alternative to the embodiment with separate liquid baths for each reactor is for all the reactors, or some of them, to be connected to a common liquid bath.

As an alternative to the embodiment of the gas treatment unit according to FIG. 2, a conventional absorber/stripper system can be used. In this case it is preferable to use only one absorber, to which essentially all the combustion gas and green liquor 27, with a high content of $NaHCO_3$ and NaHS, as well as low-sulphide liquor 11, are conveyed. Liquor issuing from the absorber is conveyed onwards to a stripper where the pressure is lowered so that H2S and $CO_2$ are driven off. The absorber/stripper system can also be supplemented, if so desired, with a quench having good gas/liquid contact as well as a condenser 18.

An interesting alternative embodiment is to use the pre-impregnation vessel or the like of the cooking department as the stripper 10. The chip column in this case will act as packing material. This concept has the advantage that encrustation of the packing material is avoided, at the same time as pre-treatment of the chips with $H_2S$ and $Na_2CO_3$ is achieved. Such pre-treatment of the chips greatly improves the cooking result.

The gasification temperature in the reactors can be 500–1600° C., preferably 700–1300° C., and more preferably 800–1000° C., and the system pressure can be up to 150 bar, preferably 21–50 bar, for one or more reactors.

One of the reactors, however, can operate at a lower pressure, preferably 1.5–10 bar (absolute) and more preferably 1.5–4 bar (absolute). The temperature in this reactor in this case remains in the lower region of the abovementioned ranges. However, this reactor can also operate at relatively high pressure, even though a compressor is then required for possible return of $H_2S$. It is therefore conceivable that the reactors can operate at the same pressure and temperature. If this is the case, different process conditions are established in the different reactors by means of the fact that one or more process chemicals are recovered selectively from the formed liquor and/or gas and are thereafter returned in whole or in part to one or more of the reactors, the said reactor or reactors being other than the reactor from which the said liquor and/or gas originates. A further variant is that the return is effected in a crosswise manner. In this case, process chemicals are recovered from liquor and/or gas from a first reactor and are thereafter returned in whole or in part to a second reactor, at the same time as process chemicals are recovered from liquor and/or gas from the second reactor and are thereafter returned in whole or in part to the first reactor.

As an alternative to using strippers for driving off $H_2S$ and $CO_2$, it is possible to use a system with stepwise flashing or expansion. It is in this case preferable for the concluding expansion stage, for driving off $CO_2$, to be carried out at a low pressure, for example 0.5 bar absolute, in which case the issuing liquor obtained is of higher concentration and lower temperature. If appropriate, one or more desorption towers, for example with Linder bases or structured packing, can also be used for the driving-off.

Some of the $H_2S$ from the stream 14 can optionally be used for direct admixture to the sulphide-rich liquor 9 if even greater sulphidity is desired.

An alternative possibility for creating a high partial pressure of hydrogen sulphide in one or more gasification reactors is the addition of external sulphur, for example petroleum coke with a content of 3 to 6% sulphur. This coke additionally constitutes a substantial addition of fuel of high thermal efficiency. In the case of addition of external sulphur, the latter is expediently recovered in whole or in part as $H_2S/SO_2$ or elemental sulphur, for example by using of a so-called Claus process.

The Claus process can also be used to produce elemental sulphur from the stream 14 which has been separated off. It may be expedient to do this if there is insufficient selectivity in respect of the separation. In this case, sulphur is returned in elemental form to the black liquor or directly to the reactor at a high $H_2S$ partial pressure.

If the first reactor is operating at a lower pressure than the second one, it is expedient to use a combined cycle concept with a single flue gas outlet for recovering energy from the combustion gases. The combustion gas at higher pressure is in this case conveyed to a gas turbine, and the exhaust gas from this, containing 12–15% oxygen at a temperature of approximately 550° C., is used as combustion air in a gas boiler. The fuel for the gas boiler consists of the combustion gas at lower pressure.

The process has been described here with sodium as base, but the same positive advantages are of course obtained in a process with, for example, potassium as base. The principle can also be applied to a gasification process using another type of reactor design or using other types of spent liquors, for example spent bleaching liquors, spent liquors from the production of semi-chemical pulp (for example CTMP), etc. The term spent liquor is used to refer to what in more modern terminology is called return liquor.

CALCULATION EXAMPLE

The following table shows the balance for an installation with two reactors in accordance with the preferred embodiment. The first reactor has $H_2S$ return corresponding to 4–6 times incoming sulphur in black liquor, and the second reactor operates with good contact between gas and quench liquid. The balance is based on incoming black liquor containing 1800 kg dry substance.

|  | Reactor line 1 | Reactor line 2 | Unit |
| --- | --- | --- | --- |
| Dry substance | 610 | 1190 | kg |
| Reactor pressure | 1.5–4.0 | 25 | bar(a) |
| Energy value, gas | 1050 (gas boiler) | 2650 (gas turbine) | kW |
| $Na_2S$ in formed liquor | 190 | — | kg |
| $Na_2CO_3$ in formed liquor | 12 | 545 | kg |
| NaOH in formed liquor | 6 | — | kg |

I claim:

1. Process for recovering chemicals and energy from spent liquor obtained during paper pulp production comprising:

gasifying spent liquor in a first gasification reactor under a first pressure and a first temperature to produce a first smelt and a first combustion gas having a first concentration of process chemicals;

dissolving said first smelt in a first aqueous liquid in a first quench vessel to produce a first liquor having a first concentration of process chemicals, wherein said first quench vessel containing a first dip tube connected to said first gasification reactor, said first dip tube opening into said quench vessel above a pool of said first aqueous liquid, whereby contact between said combustion gas and said first aqueous liquid in said pool is substantially avoided;

gasifying spent liquor in a second gasification reactor under a second temperature and a second pressure to produce a second smelt and a second combustion gas having a second concentration of process chemicals;

dissolving said second smelt in a second aqueous liquid in a second quench vessel to produce a second liquor having a second concentration of process chemicals, wherein at least one of said first temperature or first pressure is selected to be different from said second temperature or second pressure such that at least one of said first concentration of process chemicals in said first combustion gas or said first liquor being different from said second concentration of process chemicals in said second combustion gas or said second liquor;

recovering at least one process chemical from said first liquor, said first combustion gas, said second liquor, or said second combustion gas; and supplying at least a portion of said recovered process chemical to a gasification reactor or quench vessel different from the gasification reactor which originated the process chemical.

2. A process according to claim 1, further comprising supplying at least a portion of said recovered chemical to a gasification reactor different from the gasification reactor which originated said process chemical.

3. A process according to claim 1, further comprising conducting said process such that the concentration of $HCO_3^-$ and $HS^-$ in one of the liquid pools is greater than another liquid pool.

4. A process according to claim 3, further comprising conducting said step of dissolving said second smelt in a said aqueous liquid in a second quench vessel containing a pool of said second aqueous liquid, said first quench vessel being constructed and arranged to provide a first level of contact between said combustion gas and said pool of said first aqueous liquid such that said first liquor has a first concentration of $HCO_3^-$ and $HS^-$, and said second quench vessel being constructed and arranged to provide a second level of contact between said combustion gas and said pool of said second aqueous liquid such that said second liquor has a second concentration of $HCO_3^-$ and $HS^-$ that is different from said first concentration.

5. A process according to claim 4, wherein said second level of contact is greater than said first level of contact such that the concentration of $HCO_3^-$ and $HS^-$ is greater in said second liquor than said first liquor.

6. A process according to claim 5, further comprising recovering $H_2S$ and $CO_2$ selectively from said second liquor.

7. A process according to claim 6, further comprising selectively recovering $H_2S$ from said second liquor by passing said second liquor through a stripper vessel for treating chips.

8. A process according to claim 6, further comprising supplying at least a portion of said recovered $H_2S$ to said first gasification reactor.

9. A process according to claim 8, wherein a gas stream supplied to said first gasification reactor contains at least 10% by weight of said recovered $H_2S$.

10. A process according to claim 8, wherein a gas stream supplied to said first gasification reactor contains at least 20% by weight of said recovered $H_2S$.

11. A process according to claim 8, wherein a gas stream supplied to said first gasification reactor contains at least 40% by weight of said recovered $H_2S$.

12. A process according to claim 3, further comprising recovering $H_2S$ and $CO_2$ selectively from the liquor having a higher concentration of $HCO_3^-$ and $HS^-$.

13. A process according to claim 12, further comprising selectively recovering $H_2S$ from said liquor by passing said liquor through a stripper vessel for treating chips.

14. A process according to claim 12, further comprising supplying at least a portion of said recovered $H_2S$ to one or more gasification reactors other than the gasification reactor from which the pool of aqueous liquid originates.

15. A process according to claim 14, wherein a gas stream supplied to said one or more gasification reactors other than the gasification reactor from which the pool of aqueous liquid originates contains at least 10% by weight of said recovered $H_2S$.

16. A process according to claim 14, wherein a gas stream supplied to said one or more gasification reactors other than the gasification reactor from which the pool of aqueous liquid originates contains at least 20% by weight of said recovered $H_2S$.

17. A process according to claim 14, wherein a gas stream supplied to said one or more gasification reactors other than the gasification reactor from which the pool of aqueous liquid originates contains at least 40% by weight of said recovered $H_2S$.

18. A process according to claim 1, wherein said second gasification reactor operates at a higher pressure than said first gasification reactor and the temperature in said second aqueous pool is greater than the temperature in said first aqueous pool.

19. A process according to claim 18, wherein a pressure in said first gasification reactor is between about I to about 10 bar and a pressure in said second gasification reactor is between about 20 to about 50 bar.

20. A process according to claim 1, wherein said second quench vessel containing a dip tube connected to said second gasification reactor, said second dip tube opening into said second quench vessel beneath a surface of a pool of said second aqueous liquid in said second quench vessel, further comprising forcing said combustion gas to flow through said second aqueous liquid, wherein said second liquor comprises a green liquor containing greater concentrations of $HCO_3^-$ and $HS^-$ than said first liquor.

21. A process according to claim 1, further comprising the step of supplying a first portion of a spent liquor to said first gasification reactor and a second portion said spent liquor to said second gasification reactor.

22. Process for recovering chemicals and energy from spent liquor obtained during paper pulp production comprising:

gasifying spent liquor in a first gasification reactor;

passing said first combustion gas through a first dip tube of a first quench vessel, said first dip tube opening into said quench vessel above a pool of a first aqueous liquid, whereby contact between said combustion gas and said first aqueous liquid in said pool is substantially avoided;

dissolving said first smelt in said first aqueous liquid to produce a first liquor having a first concentration of process chemicals;

gasifying spent liquor in a second gasification reactor;

passing said second combustion gas through a second dip tube in a second quench vessel, said second dip tube opening into said quench vessel beneath a surface of a pool of a second aqueous liquid in said second quench vessel such that said combustion gas is forced to flow through said second aqueous liquid;

dissolving said second smelt in said second aqueous liquid to produce a second liquor having a second concentration of process chemicals, wherein said second liquor comprises a green liquor containing greater concentrations of $HCO_3^-$ and $HS^-$ than said first liquor;

recovering $H_2S$ from said second aqueous liquid; and supplying at least a portion of said recovered $H_2S$ to said first gasification reactor.

23. A process according to claim 22, wherein a gas stream supplied to said first gasification reactor contains at least 10% by weight of said recovered $H_2S$.

24. A process according to claim 22, wherein a gas stream supplied to said first gasification reactor contains at least 20% by weight of said recovered $H_2S$.

25. A process according to claim 22, wherein a gas stream supplied to said first gasification reactor contains at least 40% by weight of said recovered $H_2S$.

26. A process according to claim 22, wherein said second gasification reactor operates at a higher pressure than said first gasification reactor and the temperature in said second aqueous pool is greater than the temperature in said first aqueous pool.

27. A process according to claim 26, wherein a pressure in said first gasification reactor is between about 1 to about 10 bar and a pressure in said second gasification reactor is between about 20 to about 50 bar.

28. A process according to claim 22, further comprising forcing said second combustion gas to bubble through said second aqueous liquid several times.

29. A process according to claim 22, further comprising the step of supplying a first portion of a spent liquor to said first gasification reactor and a second portion said spent liquor to said second gasification reactor.

* * * * *